Nov. 9, 1971  E. J. SLUETZ  3,618,196

FLASH TRAP FOR FRICTION WELDING

Filed July 7, 1969  2 Sheets-Sheet 1

INVENTOR
EDWARD J. SLUETZ

BY
Fryer, Tjensvold, Feix, Phillips & Lempio
ATTORNEYS

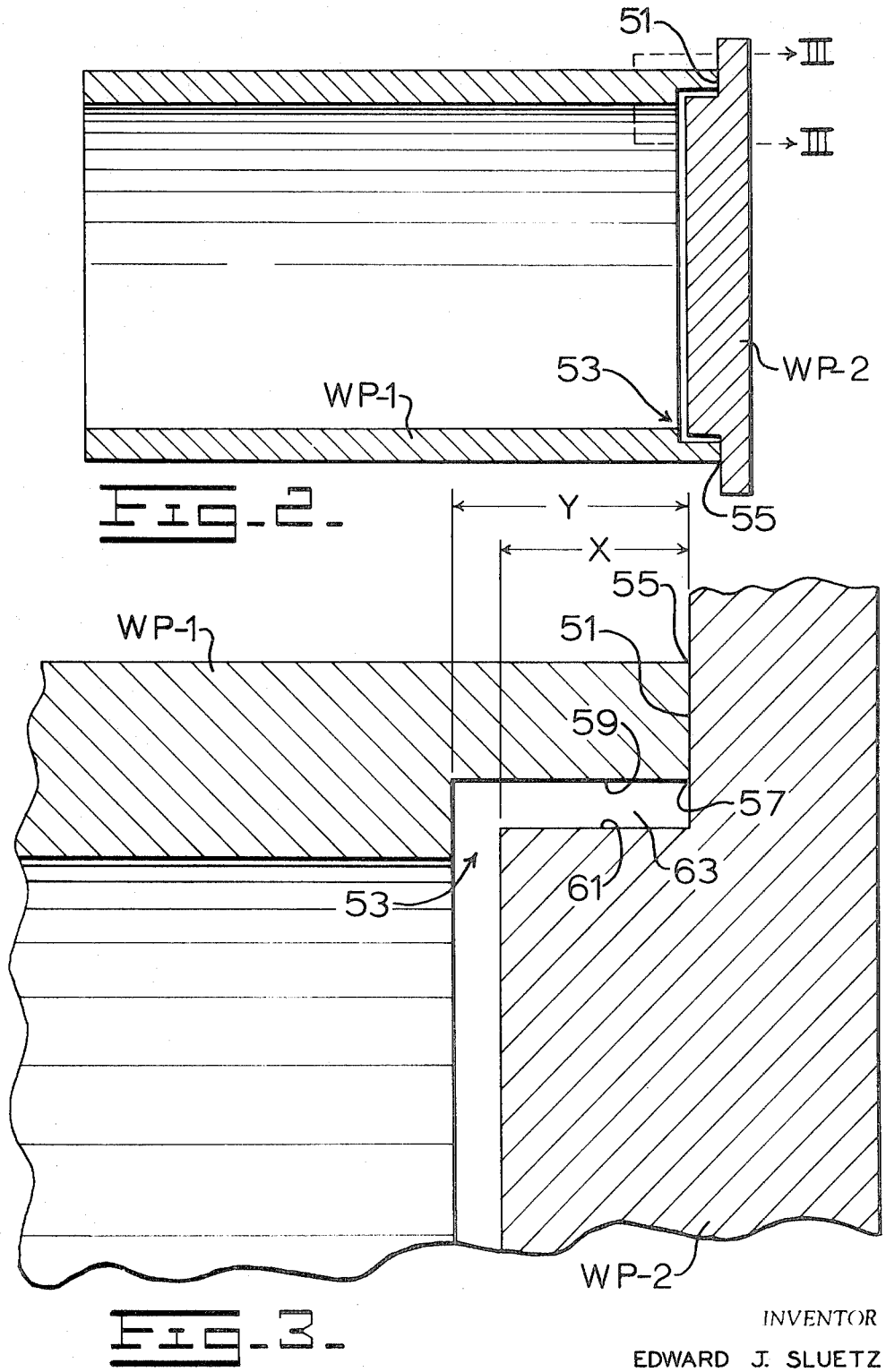

United States Patent Office 3,618,196
Patented Nov. 9, 1971

3,618,196
FLASH TRAP FOR FRICTION WELDING
Edward J. Sluetz, Peoria, Ill., assignor to Caterpillar Tractor Co., Peoria, Ill.
Filed July 7, 1969, Ser. No. 839,415
Int. Cl. B23k 27/00
U.S. Cl. 29—470.3
9 Claims

ABSTRACT OF THE DISCLOSURE

A flash trap situated between a major weld and a minor weld produced between two weld members which are friction or inertia welded together. The trap comprises a radial void into which the flash from the major weld can expand. The opposite end of the void is closed by the minor weld which is performed utilizing such parameters as to produce no flash therefrom.

BACKGROUND AND SUMMARY OF THE INVENTION

This invention relates to a flash trap design and the method of providing an improved weld utilizing such a design. More specifically, the flash trap is formed in two weld members which are friction or inertia welded together; the weld flash produced is completely sealed within a cavity formed by the two weld members as the weld is completed. The design results in the elimination of all cracks on the internal surface of the welded assembly at the weld joint.

When two tubular members, or a tubular member and a plate member, are joined together by the friction or inertia welding process, weld flash is normally produced on the exterior and the interior surfaces at a junction point of the weld. For the purposes of this application, it shall be understood that the terms friction and inertia welding shall be entirely interchangeable, both in the description and the claims.

When a totally satisfactory weld is to be produced, the internal weld flash is unavoidable result of the welding of a tubular member. In many cases, it is impractical to remove the internal flash.

In some applications of the friction welding process, in which at least one of the weld pieces is a tubular member, the production of flash on the internal surface is detrimental to the expected use of the welded assembly. For example, if such as assembly were to be utilized as a bomb or mortar shell case, any internal flash might create cracks or small crevices where powder could be trapped and subsequent severe shock to the assembly or the flash might cause pre-ignition of such powder.

Although flash traps have been disclosed and utilized in the past, all such traps have continued to result in a crack on the internal surface of the weld pieces at the internal point at which the weld pieces meet.

On the other hand, this invention provides a flash trap which is designed so as to completely seal the internal weld flash in a cavity or void such that the internal bore of the weld assembly contains neither cracks nor weld flash. This flash trap design is characterized by a tubular member inertia welded to either a plate member or to a second tubular member. In this design, two welds are accomplished with the second weld taking place very near the end of the first weld cycle. The first weld comprises a major weld and the second weld comprises a minor weld in that it seals the cavity containing the weld flash from the major weld, without producing any flash itself. This allows the production of friction welded tubular structure having a crack-free and flashless internal bore.

This invention, together with its further objects, advantages, modes and embodiments, will become obvious to those skilled in the art by reference to the detailed description and accompanying drawings which illustrate what is presently considered to be a preferred embodiment of the best mode contemplated for utilizing the novel principles set forth in the claims.

BRIEF DESCRIPTION OF THE DRAWINGS

FIG. 2 is a longitudinal cross-section of the two weld pieces utilized in the formation of a flash trap of the present invention;

FIG. 3 is an enlarged cross-sectional view of that portion of FIG. 2 designated by the area III—III.

DETAILED DESCRIPTION

Figure 1:
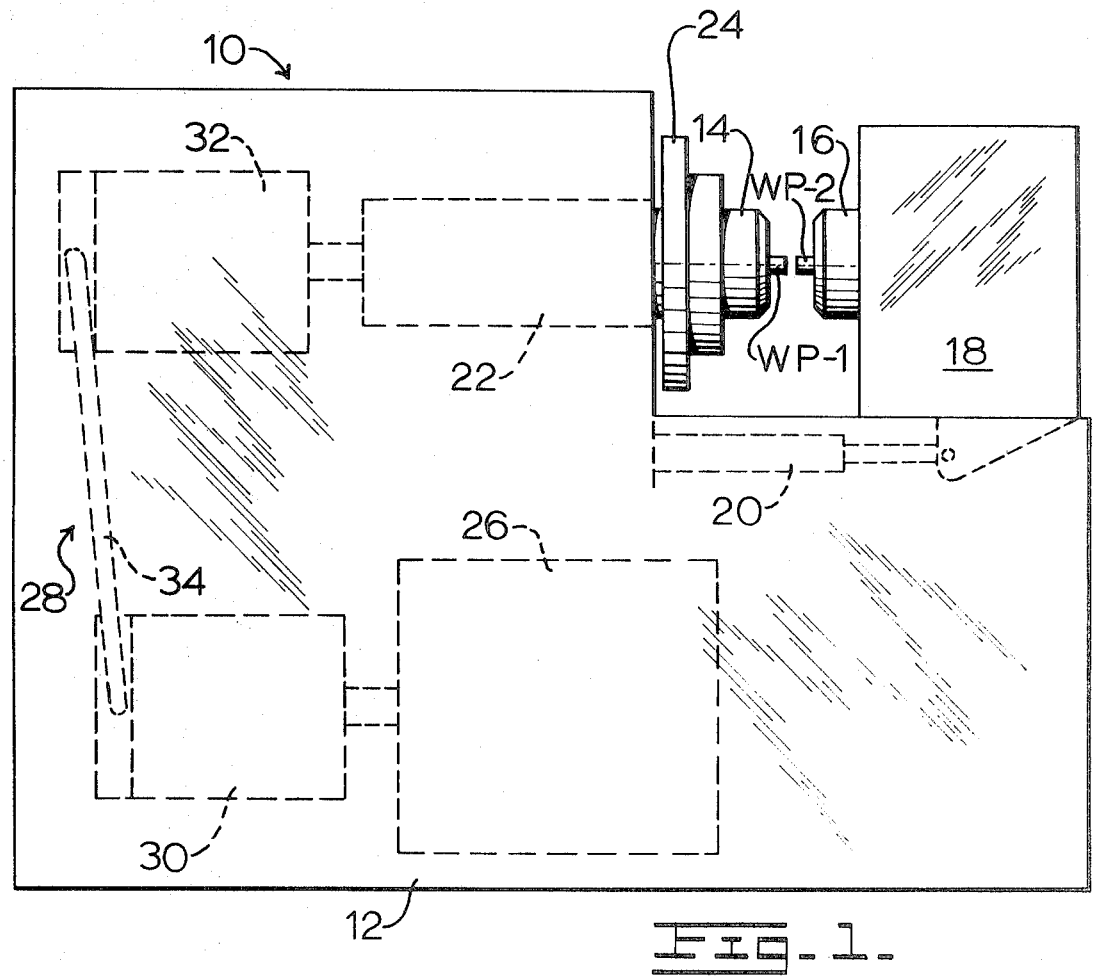
FIG. 1 is a side elevation illustrating a friction or inertia welding machine which may be utilized to practice the method of the present invention.

A friction welding machine constructed so as to produce the weld described herein is indicated generally by the reference numeral 10 in the FIG. 1. As shown, the machine comprises a frame or housing structure generally denoted at 12 for housing the various elements of the machine. The two workpieces to be welded, WP–1 and WP–2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit (not shown) regulates the pressure in a load cylinder, and thus determines the axial force with which the workpieces are engaged.

The chuck 14 is mounted on a spindle 22 and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission indicated generally by the reference numeral 28. The transmission includes a hydrostatic pump 30, a hydrostatic motor 32, and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam of the pump 30 to a position in which the pump does not displace any hydraulic fluid to the motor 32.

It is to be understood that the flywheel weights 24 are mounted on the spindle 22 so that the welding machine 10 can be operated in the manner described in U.S. Pat. No. 3,273,233 and as described in further detail below.

A welding operation to join a first workpiece to a second workpiece can be performed by operating the machine in the following general manner.

One of the workpieces WP–1, is firmly clamped in the rotatable chuck 14 located on the spindle 22. The other workpiece WP–2 is firmly clamped in the non-rotatable chuck 16 which is located on the tailstock portion 18 of the machine. Upon actuation of the motor 26, the flywheel and workpiece WP–1 are accelerated to a predetermined velocity.

Once this velocity has been obtained, the motor 26 is disconnected or shut down and the ram mechanism 20 is actuated to move tailstock portion 18 and workpiece WP–2 axially into contact with the rapidly rotating workpiece WP-1. As the two workpieces are brought into contact under the pressure applied through ram 20, heat is generated at the contacting surface or interface of the weld piece. This heating increases until the workpieces reach the weld temperature, at which time the pressure, applied by the ram 20, causes flashing or upsetting to occur. During this heating and flashing, the rotational velocity of the spindle 22 continues to decrease. At the time the rotation of the spindle ceases, upsetting has taken place and the weld is completed.

Although the above described use of the machine is that of inertia welding, it is not intended to limit this invention to an inertia welding process only, but rather to include the processes of friction welding as described in "Friction Welding of Materials" by V. I. Vill, published by American Welding Society, Inc., New York, Library of Congress Catalog Card Number 62-13420.

Referring now to FIG. 2, a typical weld assembly has been illustrated wherein a tubular member WP-1 is to be welded to a plate member WP-2 by either friction or inertia welding. WP-2 could also be a tubular member, but for purposes of this description it has been illustrated as a plate member. With reference to both FIGS. 2 and 3, two separate and distinct weld areas have been designated as a primary or major weld area 51 and a secondary or minor weld area 53. As the weld operation begins, WP-1 and WP-2 come into initial contact at the primary weld area 51. As the process progresses, weld flash is produced on the external surfaces at 55 and on the internal surface at 57. The flash produced at surface 57 flows away from the weld area and into a radial volume or cavity 63 formed between the walls 59 and 61.

Referring to FIG. 3, it will be noted that wall 59 is longer than wall 61 by a distance equal to the difference between dimensions Y and X as shown in the figure. As the weld progresses further, a distance Y will shorten and approach the dimension X due to the flashing at 55 and 57. When the dimensions of X and Y are equal, the weld members will come into contact at the secondary weld area 53. At this time, most of the stored energy utilized in producing the flash and weld at the major weld area 51 will have been expended and only a small amount of stored energy will remain. While the remaining stored energy will cause a complete bonding at the minor weld area, correct parameter selection will produce a weld at that point without production of any flash on the internal surface between the weld members at point 53.

Figure 4:
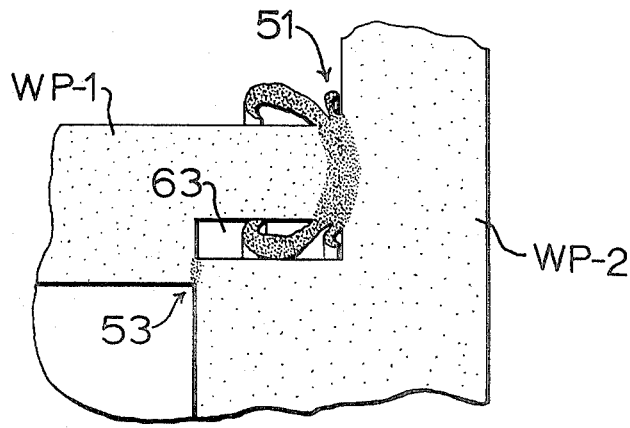
FIG. 4 is a view, similar to FIG. 3, showing the weld pieces after the completion of the major and minor welds therebetween.

When the bond at the secondary area 53 has taken place, all of the energy stored in the rotating masses of the machine will have been used and the welding process will be completed at both welds as the machine comes to a stop. Referring to FIG. 4, it can be seen that since the weld members are now joined at the major and minor weld areas, the cavity 63 containing the weld flash produced at the major weld is completely sealed and flash cannot get into the internal bore of WP-1. Since the two weld members are solidly welded at area 51 and the void is tightly sealed at area 53, there is no crack present on the internal surface between the weld members which can serve to act as a leakage crevice.

The internal flash produced at area 51 can, if desired be easily removed by a simple machining or shearing operation.

With respect to welding parameters which may be utilized in performing the major and minor welds of the type about which this disclosure is concerned, it has been found that the major weld should be commenced when the surface velocity is greater than a minimum of about 500 surface feet per minute. In such a case, energy input should fall within the range of about 10,000-40,000 ft.-lbs./in.$^2$ and the thrust load should fall within a range of approximately 10,000-35,000 lbs./in.$^2$. When these initial parameters are utilized, suitable selection of the Y and X dimensions of walls 59 and 61 will result in the minor weld occurring when approximately 3-7% of the total input energy remains to be expended and the surface velocity is approximately 18-22% of the initial surface velocity. For example, if dimension Y is manufactured to be 0.300" and dimension X is 0.230", when the length of wall 59 of WP-1 has decreased by 0.070" due to the flashing of the major weld, the minor weld will take place in the manner previously described. Since most of the stored energy has already been used in producing the flash and weld at the major weld area, only a slight amount of energy remains to produce the bond at the minor area. When parameters such as those described are utilized however, just enough energy remains to cause complete bonding at the minor area without producing any flash there. When the bond at the minor area is completed, all of the energy stored in the rotating masses of the machine will have been used and the weld process will be completed as the machine comes to a stop.

Thus the applicant has provided an article of manufacture and a process of making that article which constitutes a true advancement in the inertia welding art. Many modifications and alterations of this concept will be obvious to those skilled in the art, wherefore, what is claimed as the invention is:

1. The method of forming a friction welded article comprising the steps of
   producing relative rotation between two weld pieces,
   forcing the weld pieces together at a first weld area so as to produce flash about said first weld area, and
   forcing said weld pieces together at a second weld area only so far as to produce a flashless weld in said second weld area, including the preliminary step of
   forming said weld pieces so as to produce a flash receiving void between said first weld area and said second weld area.

2. The method of forming a friction welded article comprising the steps of
   producing relative rotation between two weld pieces,
   forcing the weld pieces together at a first weld area so as to produce flash about said first weld area, and
   forcing the weld pieces together at a second weld area so as to produce a flashless weld in said second weld area, including the preliminary steps of
   forming one of said weld pieces to be a structure having a counterbored end thereon so as to form a first weld area surface on the end of the tube and a second weld area surface on the bottom of the counterbore, and
   forming the other of said weld pieces to have complementary first and second weld area surfaces and an interconnecting wall therebetween spaced from the wall of the counterbore.

3. The method of forming a friction welded article comprising the steps of
   producing relative rotation between two weld pieces,
   forcing the weld pieces together at a first weld area so as to produce flash about said first weld area, and
   forcing the weld pieces together at a second weld area so as to produce a flashless weld in said second weld area, including performing said step of forcing said weld pieces together at said first weld area when, as minimum values,
   Surface velocity—500 ft./min.
   Thrust load—10,000 lb./in.$^2$
   Energy input—10,000 ft.-lb./in.$^2$ 4. The method of claim 3 including performing said step of forcing said weld pieces together at said second weld area when the remaining energy input has decreased to 3-7% of the original energy input and surface velocity has decreased to 18-22% of the original surface velocity.

5. The method of forming a friction welded article comprising the steps of
   producing relative rotation between two weld pieces,
   forcing the weld pieces together at a first weld area so as to produce flash about said first weld area and
   forcing the weld pieces together at a second weld area so as to produce a flashless weld in said second weld area, including performing said step of forcing said weld pieces together at said second weld area when the remaining energy input has decreased to 3–7% of the original energy input and surface velocity has decreased to 18–22% of the original surface velocity.

6. The method of claim 2 wherein said one of said weld pieces is generally tubular.

7. The method of claim 6 wherein said other of said weld pieces is generally tubular so as to produce a tube-to-tube weld.

8. The method of claim 6 wherein said other of said weld pieces is a flat plate so as to produce a tube-to-plate weld.

9. The method of claim 6 including the step of stopping the relative rotation between the weld pieces at the simultaneous completion of the first and second welds.

References Cited
UNITED STATES PATENTS

| | | | |
|---|---|---|---|
| 3,421,201 | 1/1969 | Oberle et al. | 29—470.3 |
| 3,444,611 | 5/1969 | Bogart | 29—470.3 |
| 3,452,421 | 7/1969 | Cheng et al. | 29—470.3 |
| 3,477,115 | 11/1969 | Martin et al. | 29—470.3 |
| 3,463,843 | 8/1969 | Taylor et al. | 264—68 |
| 3,499,068 | 3/1970 | Brown | 264—68 |

JOHN F. CAMPBELL, Primary Examiner

R. J. CRAIG, Assistant Examiner

U.S. Cl. X.R.

156—73; 228—2